United States Patent
Tsai (10) Patent No.: US 10,401,717 B2
(45) Date of Patent: Sep. 3, 2019

(54) PROJECTING DEVICE AND ELECTRONIC DEVICE HAVING A PROJECTING DEVICE

(71) Applicant: ASUSTEK COMPUTER INC., Taipei (TW)

(72) Inventor: Po-An Tsai, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/051,575

(22) Filed: Aug. 1, 2018

(65) Prior Publication Data
US 2019/0041730 A1 Feb. 7, 2019

(30) Foreign Application Priority Data
Aug. 4, 2017 (CN) .................... 2017 2 0967796 U (51) Int. Cl.
| | |
|---|---|
| *G03B 21/14* | (2006.01) |
| *G06F 1/16* | (2006.01) |
| *G03B 21/00* | (2006.01) |
| *G03B 21/20* | (2006.01) |

(52) U.S. Cl.
CPC ......... *G03B 21/145* (2013.01); *G03B 21/001* (2013.01); *G03B 21/2033* (2013.01); *G03B 21/2046* (2013.01); *G06F 1/1607* (2013.01); *G06F 1/1639* (2013.01)

(58) Field of Classification Search
CPC .............. G03B 21/145; G03B 21/2033; G03B 21/2046; G06F 1/1607
See application file for complete search history.

(56) References Cited

U.S. PATENT DOCUMENTS

| | | | | |
|---|---|---|---|---|
| 5,934,223 | A * | 8/1999 | Ellery-Guy | A01K 15/025 119/702 |
| 7,824,041 | B2 | 11/2010 | Liu et al. | |
| 2009/0135379 | A1 | 5/2009 | Liu et al. | |
| 2012/0092567 | A1* | 4/2012 | Jikuya | G06F 1/1639 348/789 |
| 2012/0229781 | A1* | 9/2012 | Jikuya | G06F 1/1639 353/119 |
| 2012/0293778 | A1 | 11/2012 | Furuichi et al. | |
| 2013/0033871 | A1* | 2/2013 | Totani | F21V 14/003 362/294 |

FOREIGN PATENT DOCUMENTS

| | | |
|---|---|---|
| CN | 204665186 U | 9/2015 |
| EP | 2498164 A2 | 9/2012 |
| TW | M462626 U | 10/2013 |

* cited by examiner

*Primary Examiner* — Sultan Chowdhury
*Assistant Examiner* — Magda Cruz
(74) *Attorney, Agent, or Firm* — Bacon & Thomas, PLLC (57) ABSTRACT

A projecting device is provided. The projecting device is adapted to assembling with an electronic device. The projecting device comprises a main body, a light emitting portion, a rotating portion, and an adjusting portion. The main body includes a first opening and a second opening. The light emitting portion is disposed in the main body, and transmits a light through the first opening. The rotating portion is disposed in the main body and connected with the light emitting portion. The adjusting portion is disposed in the second opening and connected with the rotating portion. The light emitting portion drives the rotating portion to rotate through the adjusting portion to adjust the angle of the light.

8 Claims, 8 Drawing Sheets

PROJECTING DEVICE AND ELECTRONIC DEVICE HAVING A PROJECTING DEVICE

CROSS-REFERENCE TO RELATED APPLICATION

This application claims the priority benefit of Chinese application serial No. 201720967796.7, filed on Aug. 4, 2017. The entirety of the above-mentioned patent application is hereby incorporated by reference herein and made a part of the specification.

BACKGROUND OF THE INVENTION

Field of the Invention

The invention relates to an electronic device and, more particularly, to an electronic device applying a projecting device.

Description of the Related Art

At present, in order to enhance the game atmosphere during users playing games, some manufacturers set up LED projection lights around a display to generate projection images on the walls to provide users better game experience. However, the projection images are often blocked by the display faced the users, therefore, it is difficult to design the projecting position. In addition, when the projecting direction is horizontal to the ground or perpendicular to the wall, general LED projectors project images without adjusting the images to fit the projecting object. It results in the limitation of the projection position, which is inconvenient for the user and does not meet the requirements.

BRIEF SUMMARY OF THE INVENTION

A projecting device is provided. The projecting device is adapted to assemble with an electronic device. The projecting device comprises a main body, a light emitting portion, a rotating portion, and an adjusting portion. The main body includes a first opening and a second opening. The light emitting portion is disposed in the main body, and transmits a light through the first opening. The rotating portion is disposed in the main body and connected with the light emitting portion. The adjusting portion is disposed in the second opening and connected with the rotating portion. The light emitting portion drives the rotating portion to rotate through the adjusting portion to adjust the angle of the light.

An electronic device of the disclosure comprises a projecting device, a detector, and a controller. The projecting device comprises a main body, a graphic element, a light emitting portion, a rotating portion, and an adjusting portion. The main body includes a first opening and a second opening. The light emitting portion is disposed in the main body and transmits a light through the graphic element to form a projecting image on a target object. The rotating portion is disposed in the main body and connected with the light emitting portion. The adjusting portion is disposed in the second opening and connected with the rotating portion. The light emitting portion drives the rotating portion to rotate through the adjusting portion to adjust the angle of the light. The detector detects a position information of the projecting image with respect to the main body. The controller adjusts an image information of the graphic element according to the position information. In an embodiment, the image information is proportion of the graphic element.

These and other features, aspects and advantages of the present invention will become better understood with regard to the following description, appended claims, and accompanying drawings.

DETAILED DESCRIPTION OF THE EMBODIMENTS

The embodiment and operation principle of the projecting device or the electronic device of the present invention is described below by a plurality of embodiments. Those skilled in the art to which the present invention belongs generally understand the features of the present invention through the embodiments, and can perform combination, modification, replacement or conversion based on the spirit of the creation.

Figure 1:
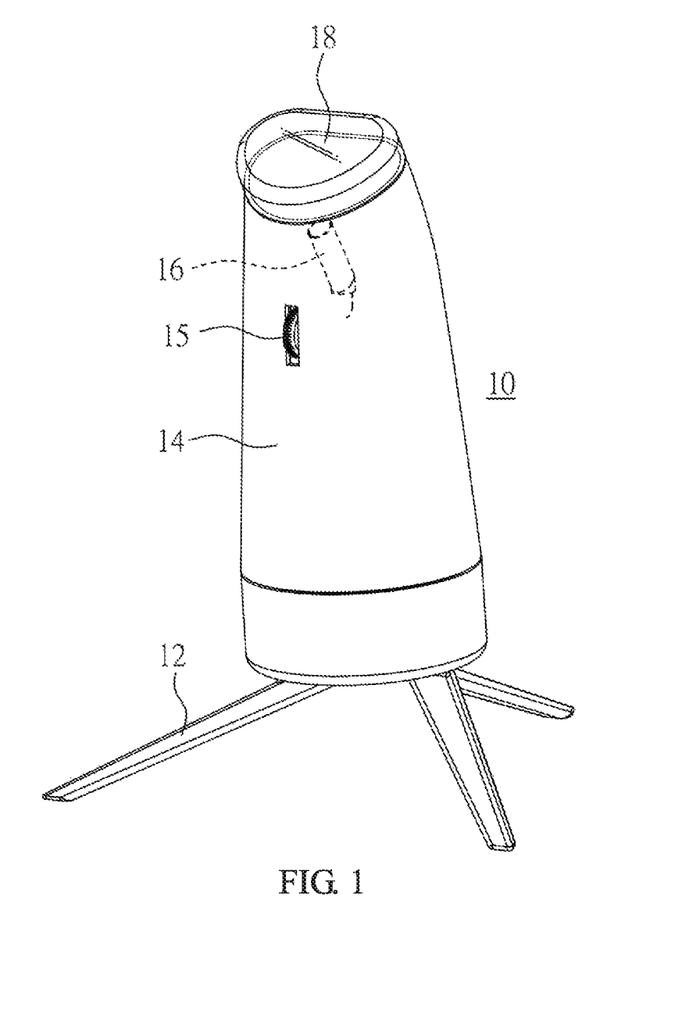
FIG. 1 is a schematic diagram of a projecting device according to an embodiment.
Figure 2:
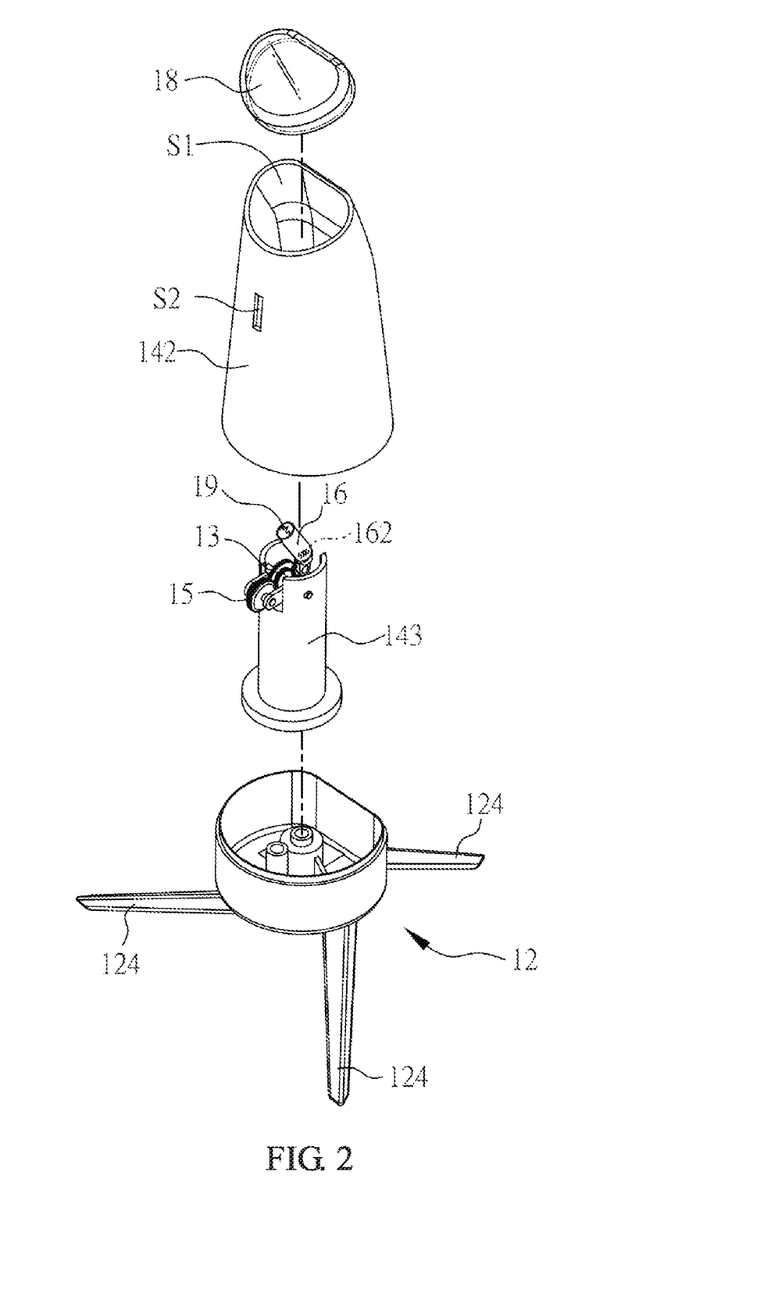
FIG. 2 is an exploded view of a detailed structure of a projecting device according to an embodiment.

FIG. 1 is a schematic diagram of a projecting device 10 according to an embodiment. FIG. 2 is an exploded view of a detailed structure of a projecting device 10 according to an embodiment. Please refer to FIG. 1 and FIG. 2. The following describes the details of the structure.

As shown in FIG. 1 and FIG. 2, in an embodiment, the projecting device 10 includes a rotating portion 13, a main body 14, a control portion 15, and a light emitting portion 16.

The main body 14 includes a first opening S1, a second opening S2, a base 12, a casing 142, and a support 143. The base 12 includes a stand 124. The number of the stand 124 is at least three, which are configured in an equiangular manner to achieve a stable support. The base 12 is connected to the support 143 in various ways to support a display monitor of an electronic device.

The casing 142 of the main body 14 encases the support 143 outside. The rotating portion 13 and the adjusting portion 15 are configured in the main body 14, such as on the support 143, which is not limited. The rotating portion 13 connects to the adjusting portion 15. The second opening S2 is disposed on the casing 142. When the casing 142 encases the support 143, a part of the adjusting portion 15 is exposed from the second opening S2, that is, a portion of the adjusting portion 15 is exposed outside the main body 14.

The adjusting portion 15 drives the rotating portion 13 to rotate when the adjusting portion 15 is driven by an external force. For example, a part of the adjusting portion 15 exposed from the second opening S2 is similar to a mouse wheel and is to be rotated by a user. The adjusting portion 15 is connected to the rotating portion 13 in various ways.

For example, the adjusting portion 15 and the rotating portion 13 include gear structures at the connecting location, and when the adjusting portion 15 itself is rotated by a force, the gear structures of the both rotate together. Alternatively, the adjusting portion 15 is directly fixed to the rotating portion 13, and when the adjusting portion 15 is rotated by a force, the rotating portion 13 is rotated together. The connecting way of the adjusting portion 15 and the rotating portion 13 described above is taken as an example and not for limitation. In embodiments, the adjusting portion 15 is rotated by the rotating portion 13 in various ways.

The light emitting portion 16 is disposed in the main body 14, and is adjacent to one end of the main body 14, for example, adjacent to the top of the main body 14. The first opening S1 is disposed on the main body 14, such as at the top of the main body 14, therefore, the light emitting portion 34 transmits a light through a first opening S1. In addition, the light emitting portion 16 is connected to the rotating portion 13. Therefore, when the rotating portion 13 is rotated by the adjusting portion 15, the light emitting portion 16 is rotated with the rotating portion 13, that is to say, the adjusting portion 15 drives the light emitting portion 16 through the rotating portion 13 to adjust the angle of light. The light emitting portion 16 and the rotating portion 13 are connected and rotated in various ways, which is not limited.

In addition, the light emitting portion 16 includes a LED element 162, and the LED element 162 includes one or more light emitting diodes for emitting light when conducting.

In some embodiments, the projecting device 10 further includes a top cover 18. The top cover 18 is disposed on the top of the projecting device 10 to cover the first opening S1 and is assembled with the casing 142 to protect the light emitting portion 16. The top cover 18 is made of a transparent material, which is not limited.

When a graphic element 19 is disposed between the LED element 162 and the top cover 18 of the light emitting portion 16, the light emitted by the LED element 162 passes through the graphic element 19 and the top cover 18, and forms a projecting image on a target object, such as a wall or a ceiling (To make the explanation more clear, a projection image is formed on a wall or ceiling in the following example). In an embodiment, the graphic element 19 is disposed on the top cover 18, but in other embodiments, the graphic element 19 is disposed on the light emitting portion 16. The arrangement of the graphic element 19 is implemented in various ways. For example, the graphic element 19 is printed directly on the top cover 18 or the light emitting portion 16, or a transparent panel with the graphic element 19 is clamped under the top cover 18 or inside the light emitting portion 16, which is not limited. The operation between the light emitting portion 16, the top cover 18, and the graphic element 19 described above is only for example. Actually, any setting method that forms a projection image on a target object belongs to the scope of this work.

Figure 3:
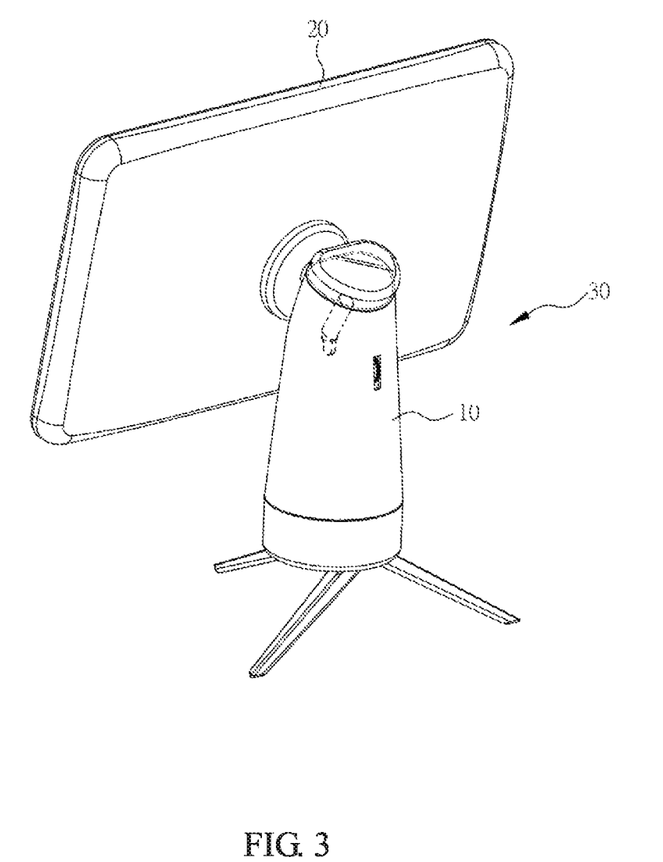
FIG. 3 is a schematic diagram of a projecting device assembled with an electronic device according to an embodiment.

FIG. 3 is a schematic diagram of a projecting device 10 assembled with an electronic device 30 according to an embodiment. Please refer to FIG. 1 to FIG. 3. In the embodiment, the electronic device 30 has a display monitor 20 and the projecting device 10.

The display monitor 20 is various types of displays, such as a display of a desktop computer, a display of a notebook computer, a display of a handheld electronic device, etc. The structure of the display monitor 20 belongs to the general technical field of the art and is not the focus in this embodiment, which is not described in detail herein.

When the projecting device 10 includes the support 143, the display monitor 20 is assembled with the projecting device 10, and the support 143 supports the display monitor 20. The assembling location of the display monitor 20 and the projecting device 10 includes a hinge structure, therefore, the position of the display monitor 20 is adjustable according to user's requirement. Since how the display monitor 20 assembling with the projecting device 10 belongs to the general knowledge in the art and is not the focus herein, it is not described here in detail.

By the collocation of the projecting device 10 and the electronic device 30, when the user operates the electronic device 30, the light emitting portion 16 emits a light, and the angle of the light is adjustable through the adjusting portion 15 to obtain a good atmosphere effect.

Figure 4A:
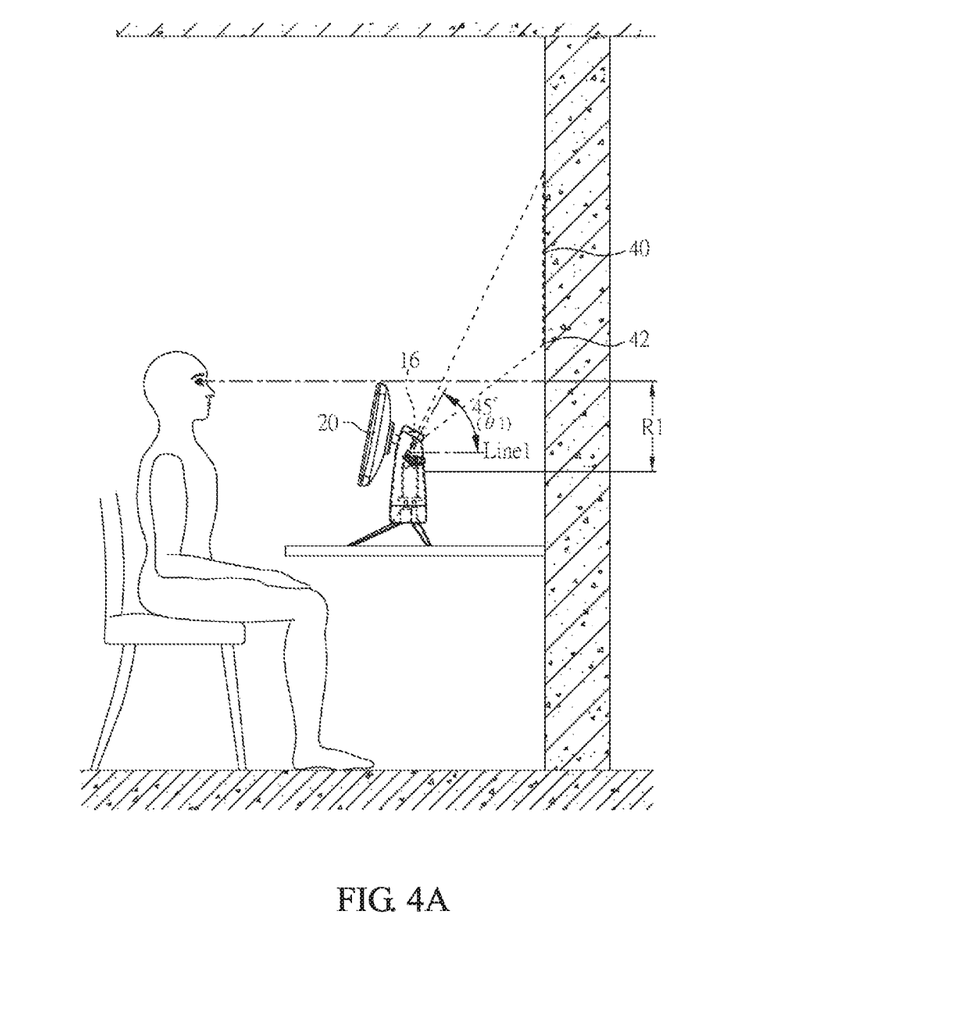
FIG. 4A is a schematic diagram of an implementation of a light emitting portion according to an embodiment.

FIG. 4A is a schematic diagram of an implementation of a light emitting portion 16 according to an embodiment. Please refer to FIG. 1 to FIG. 4. In the embodiment, the light emitting portion 16 is tilted disposed in the main body 14. When the base 12 of the main body 14 is placed on a plane (such as a desktop), an angle ($\theta 1$) is formed between the light emitting portion 16 and a horizontal line parallel to the desktop, and the light from the light emitting portion 16 forms a projecting image 40 on the wall.

In the embodiment, the light emitting portion 16 is configured to form an angle ($\theta 1$) of at least 45 degrees with a horizontal line (Line1) parallel to the desktop. That is to say, the center path of the light emitted by the light emitting portion 16 forms approximately the angle of at least 45 degrees with the desktop. When the light emitting portion 16 is rotated, the angle ($\theta 1$) between the light emitting portion 16 and the tabletop is changed, and the position of the projecting image 40 on the wall is also changed together, for example, the position of the projecting image 40 is moved from the wall to the ceiling.

In practice, when a user uses the electronic device 30 in a sitting position, a portion of the user's field of view is blocked by the display monitor 20, so that a visual blind zone (R1) is formed on the wall. If a part of the projecting image 40 is in the visual blind zone (R1), the part of the projecting image 40 is blocked by the display monitor 20. When the angle ($\theta 1$) is at least 45 degrees, the bottom 42 of the projecting image 40 on the wall is equal to or higher than the user's line of sight extends along the top of the display monitor 20 to the wall (that is, the top of the visual blind zone (R1)), and therefore the user is able to see the complete content of the projecting image 40.

Figure 4B:
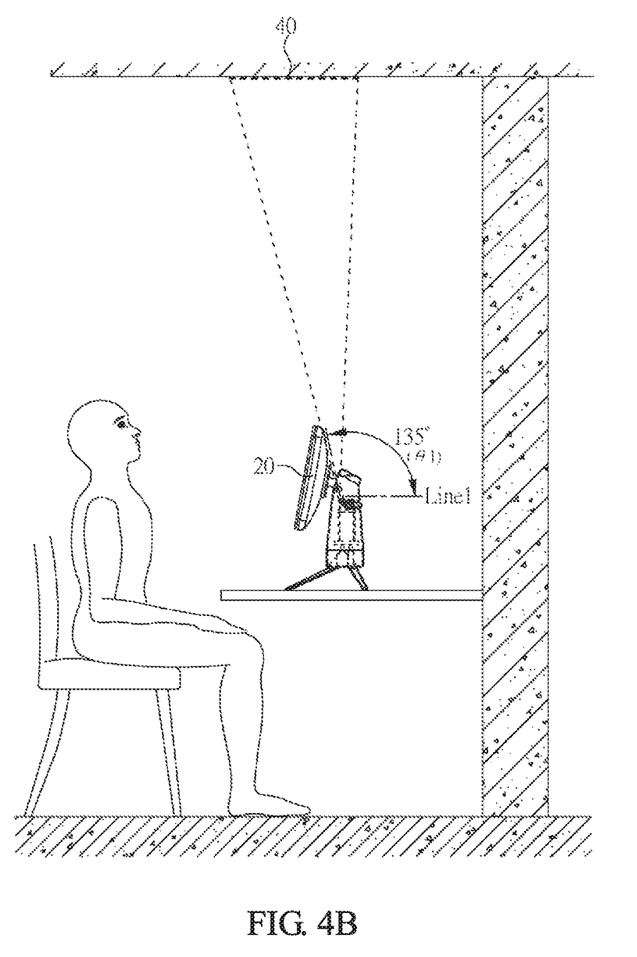
FIG. 4B is a schematic diagram of another implementation of a light emitting portion according to an embodiment.

FIG. 4B is a schematic diagram of another implementation of a light emitting portion 16 according to an embodiment. Please refer to FIG. 1 to FIG. 4A. In the embodiment, the light emitting portion 16 is rotated through the adjusting portion 15. The angle ($\theta 1$) formed between the light emitting portion 16 and the horizontal line (Line1) parallel to the desk is at most 135 degrees, that is, the central path of the light emitted by the light emitting portion 16 is formed at most the angle of 135 degrees with the tabletop. When the angle ($\theta 1$) is 135 degrees, the projecting image 40 is positioned on the ceiling and is located approximately in front of the top of the user's head, and then the user gets a full lighting atmosphere by easily seeing the projecting image 40 while operating the electronic device 10.

As shown in FIG. 4A and FIG. 4B, when the angle ($\theta 1$) is 45 degrees, the position of the projecting image 40 on the wall is a little higher than the display monitor 20. When the user applies a force on the adjusting portion 15 to drive the rotating portion 13 and the light emitting portion 16, the position of the projecting image 40 on the wall is changed and moved to the ceiling.

Please refer to FIG. 3, FIG. 4A, and FIG. 4B. In an embodiment, a rotation range of the rotating portion 13 is set to be 90 degree, which is not limited. Therefore, the angle ($\theta 1$) is range from 45 degrees to 135 degrees. The rotation range of the rotating portion 13 is set in various ways. For example, a supporting structure (such as a protrusion or a slot) is disposed on or around the rotating portion 13, so the rotating portion 13 is prevented from rotating by the protrusion when the rotating portion 13 is rotated to 90 degrees. Otherwise, a resisting structure is set on or around the adjusting portion 15 or the light emitting portion 16 to limit the rotation range. The implementations are only for example and not limited herein. Since the focus here is the rotation range of the rotating portion 13, any way to implement it is applicable, so it is not described in detail here.

Figure 5:
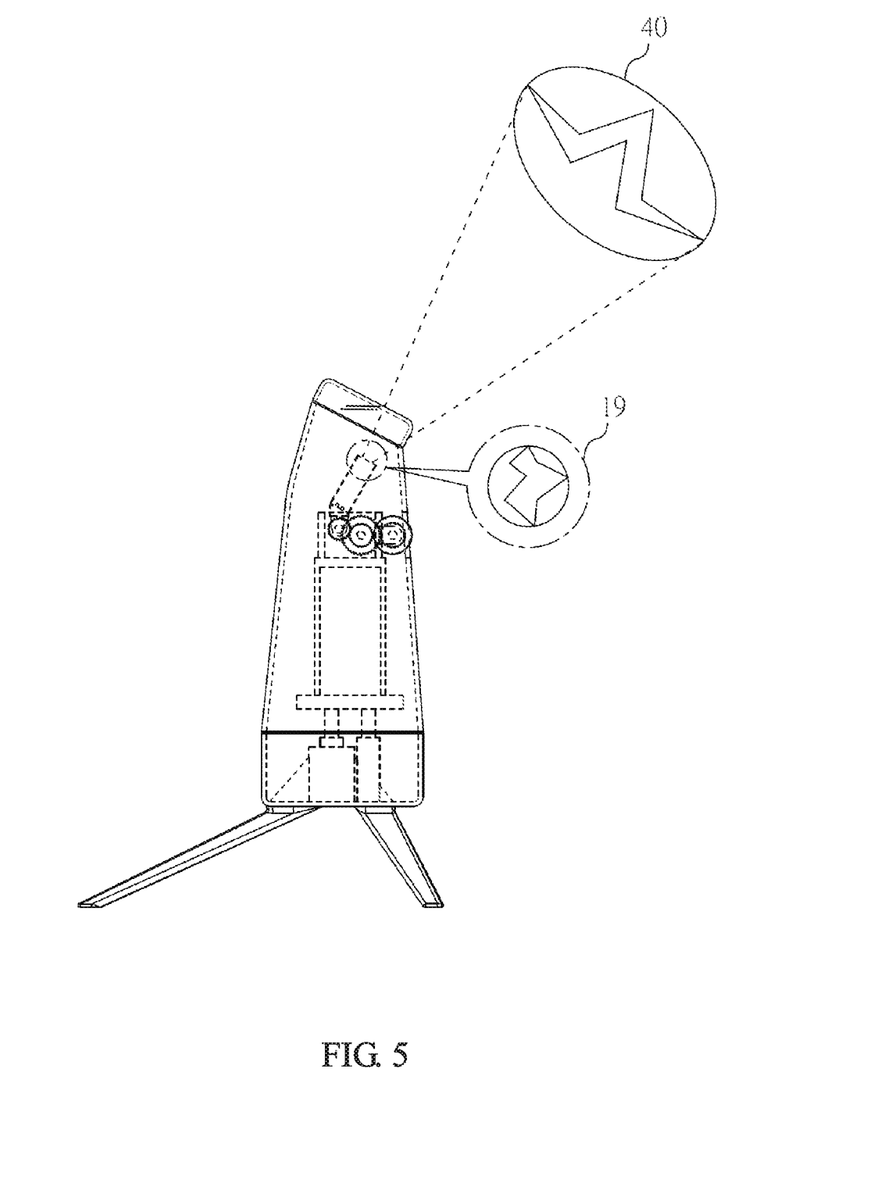
FIG. 5 is a schematic diagram of a corresponding implementation state of a light emitting portion and a projecting image according to an embodiment.

FIG. 5 is a schematic diagram of a corresponding implementation state of a light emitting portion 16 and a projecting image 40 according to an embodiment. The figure is used to represent the correspondence between the angle ($\theta 1$) and the position of the projecting image 40, and please refer to FIG. 1 to FIG. 4B at the same time.

As shown in FIG. 5, since the light emitted by the light emitting portion 16 is not parallel to the desktop, the projecting image 40 formed on the wall or the ceiling is deformed, which causes the original proportion to the projecting image 40 is different from the proportion of the projecting image 40. When the original proportion of the graphic element 19 changes, the proportion of the projecting image 40 also changes. Therefore, as long as the original proportion of the graphic element 19 is not a normal proportion, the projecting image 40 on the wall or the ceiling is able to show a normal proportion due to the non-horizontal light path caused by the angle ($\theta 1$).

In an embodiment, the original proportion (unnormal proportion) of the graphic element 19 is inversely derived from the normal proportion of the projecting image 40 through program engineering, such as restore engineering. In other embodiments, other methods are used to adjust the original proportion of the graphic element 19 to make the projecting image 40 to present a normal proportion.

Due to different users have different perspectives, usage habits, requirements for the projecting image 40 are not the same, and changing of the position of the electronic device 30 causes in the light path change. The user sets the adjusting portion 15 to adjust the angle ($\theta 1$) and the position or the proportion of the projecting image 40 according to his/her requirements, therefore, the projecting image 40 meets the requirements to get the best sound and light effects.

In addition, in an embodiment, except for adjusting the angle ($\theta 1$), the light emitting portion 16 is configured to be horizontally adjusted in the same plane direction when the size of the angle ($\theta 1$) is fixed.

In an embodiment, the user manually applies force to the adjusting portion 15 to change the position of the projecting image 40 and finds a projection effect suitable for his viewing angle. In other embodiments, the proportion of the graphic element 19 is automatically adjusted by the device itself. The following describes in detail the aspect of adjusting the graphic element 19 by the device itself.

Figure 6:
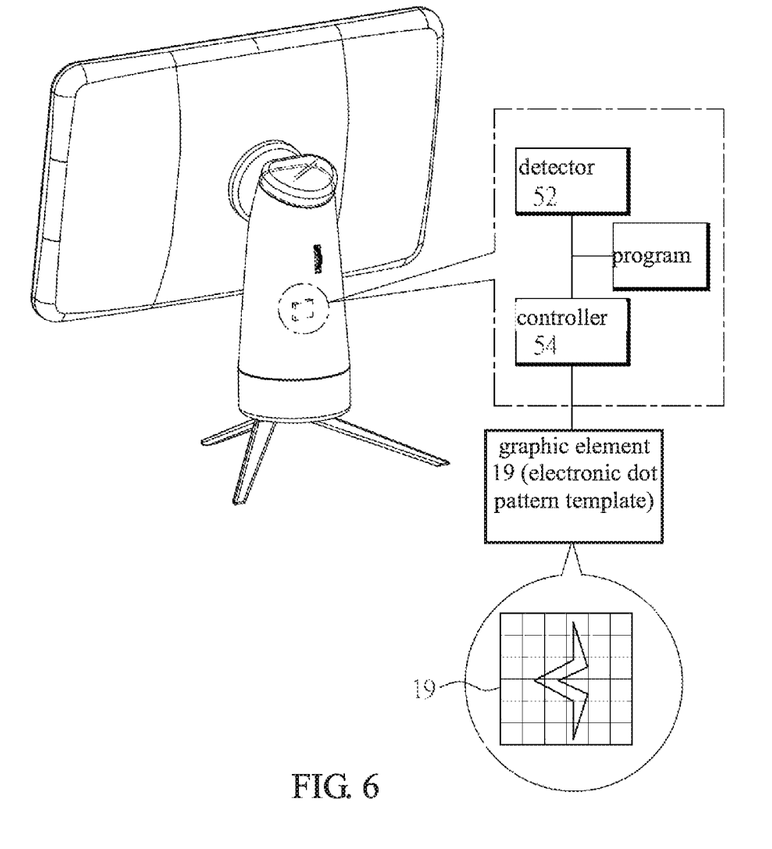
FIG. 6 is a schematic diagram of an electronic device according to another embodiment.

FIG. 6 is a detail schematic diagram of an electronic device according to another embodiment. In the embodiment, the electronic device 30 further includes a detector 52 and a controller 54. The detector 52 detects a position information of the projecting image 40 with respect to the main body 14, for example, detecting the size of the angle ($\theta 1$), which is not limited. The controller 54 is used to adjust the proportion of the graphic element 19 according to the position information detected by the detector 42.

In the embodiment, the graphic element 19 is disposed between the LED element 162 and the top cover 18 in the form of an electronic dot pattern template so that the controller 54 is able to adjust the proportion of the graphic element 19 at any time. For example, a small panel is disposed between the LED element 162 and the top cover 18. The small panel is controlled by the controller 54 to change the displayed electronic dot matrix of the graphic element 19, which is not limited.

In one embodiment, the detector 52 is one of a variety of light detectors, such as a photosensitive diode to sense the light path. In one embodiment, the data of the light path sensed by the detector 52 is processed by a microprocessor, such as executing a program to calculate the size of the angle ($\theta 1$), and handing over the calculated result to the controller 54.

In an embodiment, the detector 52 itself or the controller 54 itself executes a program to calculate position information (such as the size of the angle ($\theta 1$)). In an embodiment, the detector 52 and the controller 54 are disposed on a same integrated circuit, and the integrated circuit is disposed in the display monitor 20 or the projecting device 10. In an embodiment, the detector 52 and the controller 54 are respectively disposed in different positions in the electronic device 30.

By this, the user determines the position of the projecting image 40 through the adjusting portion 15, and the electronic device 30 automatically adjusts the proportion of the graphic element according to the size of the angle ($\theta 1$), which makes the projecting image 40 automatically form a normal proportion.

Figure 7:
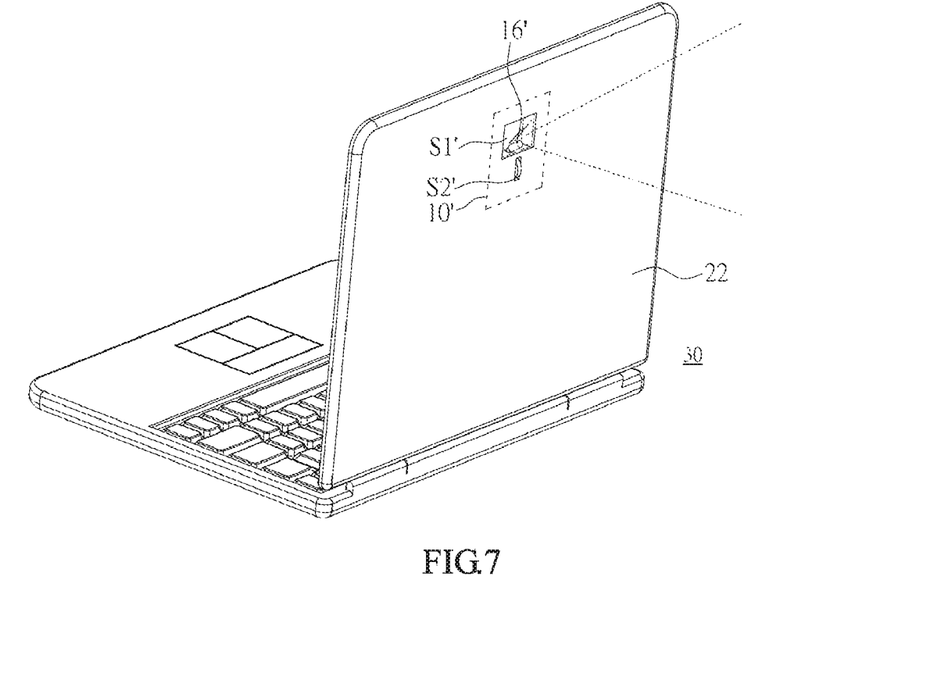
FIG. 7 is a schematic diagram of an electronic device according to another embodiment.

FIG. 7 is a schematic diagram of an electronic device according to another embodiment. Please refer to FIG. 1 to FIG. 7. Most of the elements in FIG. 7 are the same as the aforementioned embodiments, which is not described in detail, and the following describes the differences. Different from the foregoing embodiment, the electronic device 30 of this embodiment integrates the display monitor 20 with a projecting device 10'. For example, the projecting device 10' is integrated into a back cover 22 of the display monitor 20. The electronic device 30 in this embodiment is a notebook computer, a tablet computer, a smartphone, or the like.

The projecting device 10' of the embodiment includes a main body 14', a light emitting portion 16', a rotating portion 13', an adjusting portion 15', a graphic element 19', a first opening S1' and a second opening S2'. The structures of these elements themselves are similar to those in FIG. 1 to FIG. 6, and the difference is that the projecting device 10' is presented in a modularized manner in this embodiment. For example, the electronic device 30 and the projecting device 10' are integrally formed by the projecting device 10' being disposed directly in the back cover 22.

Therefore, in some embodiments, part of the projecting device 10' is regarded as part of the back cover 22, so the first opening S1' and the second opening S2' are regarded as openings on the back cover 22. In addition, in other embodiments, the back cover 22 and the projecting device 10' are not integrally formed. The projecting device 10' is a separate module and is able to be directly removed from the back cover 22.

The light emitting mechanism of the light emitting portion 16 is the same as the light emitting portion of the foregoing embodiment, which is described in detail. In addition, the projecting device 10' in this embodiment includes the top cover 18, and the proportion of the graphic element 19 is automatically adjusted by the electronic device 30 itself. In other words, the electronic device 30 of FIG. 7 is capable to be applied to various embodiments of the electronic device 30 of FIG. 1.

In sum, an improved electronic device 30 is provided. The light emitting portion 16 is utilized to make the position and the proportion of the projecting image 40 to meet the user's requirements and provide a good display effect, and then improve the user's sound and light feel.

Although the present invention has been described in considerable detail with reference to certain preferred embodiments thereof the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A projecting device, adapted to assembling with an electronic device, comprising:
    a main body, having a first opening and a second opening;
    a light emitting portion, disposed in the main body, and transmitting a light through the first opening;
    a rotating portion, disposed in the main body, and connected with the light emitting portion;
    an adjusting portion, disposed in the second opening, and connected with the rotating portion; and
    a top cover covering the first opening;
    wherein, the light emitting portion drives the rotating portion to rotate through the adjusting portion to adjust the angle of the light;
    wherein a graphic element having a first proportion is disposed between the top cover and the light emitting portion, the light from the light emitting portion passes through the graphic element and the top cover and forms a projecting image having a second proportion on a target object, and the first proportion is different from the second proportion;
    wherein an original pattern corresponding to the graphic element has a normal proportion, and a difference between the normal proportion and the second proportion is smaller than a difference between the normal proportion and the first proportion.

2. The projecting device according to claim 1, wherein the main body includes a base, a support, and a casing, the base is connected with the support, and the casing encases the support outside.

3. The projecting device according to claim 2, wherein the base is disposed on a desktop, an angle is formed between the light and a horizontal line parallel to the desktop, and the angle is range from 45 degrees to 135 degrees.

4. The projecting device according to claim 3, wherein when the size of the angle is fixed, the light emitting portion is adjusted along a horizontal direction.

5. The projecting device according to claim 1, wherein the top cover is made of transparent material.

6. An electronic device, comprising:
    a projecting device, comprising:
        a main body, having a first opening and a second opening;
        a graphic element;
        a light emitting portion, disposed in the main body, and transmitting a light through the graphic element to form a projecting image on a target object;
        a rotating portion, disposed in the main body, and connected with the light emitting portion; and
        an adjusting portion, disposed in the second opening, and connected with the rotating portion, wherein, the light emitting portion drives the rotating portion to rotate through the adjusting portion to adjust the angle of the light;
    a detector, detecting a position information of the projecting image with respect to the main body; and
    a controller, adjusting an image information of the graphic element according to the position information.

7. The electronic device according to claim 6, wherein the projecting device further includes a transparent top cover covering the first opening.

8. The electronic device according to claim 6, wherein the graphic element is an electronic dot pattern template, and the controller adjusts the image information of the electronic dot pattern template.

* * * * *